United States Patent
De La Garza et al.

(10) Patent No.: US 10,829,222 B2
(45) Date of Patent: Nov. 10, 2020

(54) AIRCRAFT PASSENGER SEAT WITH ZERO-G TAXI, TAKE-OFF AND LANDING RECLINE POSITION

(71) Applicant: B/E Aerospace, Inc., Wellington, FL (US)

(72) Inventors: Javier Valdes De La Garza, Winston-Salem, NC (US); Daniel I. Udriste, Winston-Salem, NC (US); Mark B. Dowty, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 203 days.

(21) Appl. No.: 15/818,261

(22) Filed: Nov. 20, 2017

(65) Prior Publication Data

US 2019/0152606 A1 May 23, 2019

(51) Int. Cl.
*B64D 11/06* (2006.01)

(52) U.S. Cl.
CPC ........ *B64D 11/064* (2014.12); *B64D 11/0643* (2014.12); *B64D 11/0696* (2013.01)

(58) Field of Classification Search
CPC .............. B64D 11/064; B64D 11/0696; B64D 11/0643
USPC .................................. 244/117 R, 119, 122 R
See application file for complete search history.

(56) References Cited

U.S. PATENT DOCUMENTS

| | | | |
|---|---|---|---|
| 3,834,660 A * | 9/1974 | Leffler | A61G 15/10 248/418 |
| 6,155,519 A | 12/2000 | Rajasingham | |
| 6,170,786 B1 * | 1/2001 | Park | B60N 2/0232 248/274.1 |
| 6,227,489 B1 * | 5/2001 | Kitamoto | B64D 11/00 244/118.5 |
| 6,305,644 B1 * | 10/2001 | Beroth | B64D 11/00 244/118.5 |
| 6,352,309 B1 * | 3/2002 | Beroth | B64D 11/06 297/354.13 |
| 6,409,265 B1 * | 6/2002 | Koerlin | A61G 5/006 297/325 |
| 6,688,691 B2 * | 2/2004 | Marechal | A47C 1/0352 297/317 |
| 6,695,406 B2 | 2/2004 | Plant | |
| 6,976,699 B2 * | 12/2005 | Koerlin | A61G 5/006 280/304.1 |
| 7,997,654 B2 * | 8/2011 | Ferry | B60N 2/206 297/342 |
| 8,616,643 B2 * | 12/2013 | Darbyshire | B64D 11/06 297/342 |
| 9,174,737 B2 | 11/2015 | Beroth et al. | |

(Continued)

FOREIGN PATENT DOCUMENTS

DE  10 2010 032 607 A1  2/2011
WO     2015/073363 A1  5/2015

*Primary Examiner* — Richard R. Green
*Assistant Examiner* — Arfan Y. Sinaki
(74) *Attorney, Agent, or Firm* — Suiter Swantz pc llo

(57) ABSTRACT

An aircraft seat assembly for achieving a reclined sitting position suitable for taxi-take-off and landing (TTOL). The assembly includes an independently adjustable seat back and seat bottom coupled to a frame member configured to translate relative to a base and actuators dedicated for driving independent articulation of each of the seat back, seat pan and optional legrest to achieve sitting positions including upright, lie-flat and positions therebetween.

9 Claims, 6 Drawing Sheets

(56) References Cited

U.S. PATENT DOCUMENTS

| | | | |
|---|---|---|---|
| 9,227,729 B2 * | 1/2016 | Udriste | B64D 11/06 |
| 9,284,055 B2 | 3/2016 | Beroth et al. | |
| 9,446,849 B1 * | 9/2016 | Pinkal | B64D 11/064 |
| 9,738,388 B2 * | 8/2017 | Oleson | B64D 11/064 |
| 9,854,912 B2 * | 1/2018 | Iacobucci | B60N 2/06 |
| 9,944,396 B2 * | 4/2018 | Udriste | B64D 11/0641 |
| 10,327,553 B2 * | 6/2019 | Kiwak | A47C 1/0352 |
| 2003/0189360 A1 * | 10/2003 | Laurent | B60N 2/22 297/83 |
| 2004/0036336 A1 * | 2/2004 | Veneruso | B60N 2/0232 297/354.13 |
| 2009/0242700 A1 * | 10/2009 | Raymond | B60N 2/1695 244/118.6 |
| 2012/0256457 A1 * | 10/2012 | Cailleteau | B60N 2/045 297/313 |
| 2013/0099538 A1 * | 4/2013 | Jussli | B60N 2/22 297/313 |
| 2013/0134758 A1 * | 5/2013 | Kladde | B64D 11/06 297/354.12 |
| 2014/0300145 A1 * | 10/2014 | Beroth | B64D 11/06 297/83 |
| 2014/0300161 A1 * | 10/2014 | Beroth | B64D 11/06 297/340 |
| 2015/0274301 A1 | 10/2015 | Udriste et al. | |
| 2015/0284087 A1 * | 10/2015 | Henshaw | B64D 11/064 297/318 |
| 2015/0284092 A1 * | 10/2015 | Wilkey | B60N 2/919 297/423.29 |
| 2016/0288910 A1 * | 10/2016 | Udriste | B64D 11/064 |
| 2017/0015423 A1 * | 1/2017 | Udriste | B60N 2/995 |
| 2017/0021930 A1 * | 1/2017 | Henshaw | B64D 11/064 |
| 2017/0021933 A1 * | 1/2017 | Pozzi | B64D 11/0636 |
| 2017/0152046 A1 * | 6/2017 | Ozaki | B60N 2/427 |
| 2017/0275003 A1 * | 9/2017 | Erhel | B60N 2/06 |
| 2018/0194474 A1 * | 7/2018 | Jones | B64D 11/06395 |
| 2018/0281960 A1 * | 10/2018 | Weingart | B64D 11/062 |
| 2018/0346125 A1 * | 12/2018 | Thompson | B64D 11/064 |

* cited by examiner

AIRCRAFT PASSENGER SEAT WITH ZERO-G TAXI, TAKE-OFF AND LANDING RECLINE POSITION

BACKGROUND

This application is directed to an aircraft passenger seat that is adapted to adjust in a manner that accommodates the preference of some aircraft passengers to move the seat position into a "relaxed" recline position during taxi, take-off and landing ("TTOL") phases of an aircraft flight. Current seating designs generally require TTOL seating positions to be relatively upright. Recent seating designs purporting to allow relaxed TTOL positions allow for only a modest, incremental change from the traditional upright TTOL position. This is due to the relatively complex combinations of factors affecting required restraints, multiple HIC ("Head Impact Criterion") targets, and the complexities of identifying prescribed positions sufficiently unique to offer value without approaching a flat bed position.

Flat bed positions for TTOL have been proposed that rely on complicated, multiple air bag protection systems that nevertheless must account for and accommodate the natural variation in lie-flat sleeping positions such as back, abdominal and side sleeping positions.

The present application discloses a passenger seat that permits a "zero-g" recline position suitable for TTOL phases of passenger aircraft flight. As used in this application "zero-g" refers to a recline position similar to the recline position used in space travel by flight crews. By assuming a reclined position, astronauts distribute the stresses of launch across their bodies in a safe, relatively balanced manner. To that end, the seating units astronauts sit in during launch have a reclined configuration similar to the position shown in FIG. 4 of this application. As shown, the body of the seat occupant assumes a position with the hips and knees flexed, and with the hips positioned somewhat lower than the knees. This position effectively secures the passenger in a position that provides a natural resistance to shear forces when subjected to FAR 25.562 16-g testing. This position also is of a magnitude sufficient to prevent any position other than back sleeping to occur during TTOL.

SUMMARY

Therefore, in one aspect, embodiments of the inventive concepts disclosed in this application are directed to an aircraft passenger seat adapted for maintaining a seated passenger in a recline position in the seat during TTOL of a passenger aircraft. The seat includes a seat carriage mounted for fore and aft translating movement relative to a deck of the aircraft, with a seat pan base mounted on the seat carriage for translating movement with the seat carriage. A seat pan is mounted for articulating movement relative to the seat pan base about a first pivot positioned on the seat pan base. A backrest, or seat back, is mounted for articulating movement about a second pivot positioned on the seat pan base proximate the first pivot on the seat pan base. The seat pan and the seat back are positioned for independent pivotal adjustment within a predetermined range of motion to permit the seat pan and seat back to move to a zero gravity recline position with the passenger's knees positioned above the passenger's hip region, providing resistance to forward movement of the passenger in the seat during TTOL.

In a further aspect, the passenger seat includes a leg rest pivotally mounted on the seat pan for independent movement in relation to the seat pan.

In a further aspect, the passenger seat includes respective actuators mounted on the seat for independently moving the seat pan, seat pan base and seat back.

In a further aspect, the passenger seat includes respective actuators mounted on the seat for independently moving the seat pan, seat back, leg rest and carriage.

In a further aspect, the passenger seat includes the seat pan, seat back, legrest and carriage adapted for being infinitely adjustable within the predetermined range of motion.

In a further aspect, the passenger seat includes the first pivot and second pivot on the seat pan base concentrically positioned about a single rotational axis.

In a further aspect, an aircraft passenger seat is provided and adapted for maintaining a seated passenger in a recline position in the seat during taxi, take-off and landing ("TTOL") of a passenger aircraft, and includes a seat carriage mounted on a stationary seat base for fore and aft translating movement relative to a deck of the aircraft. A seat pan base is mounted on the seat carriage for translating movement with the seat carriage and articulating movement relative to the seat carriage. A seat pan is mounted for articulating movement relative to the seat pan base about a pivot positioned on the seat pan base. A seat back is mounted for articulating movement about the pivot positioned on the seat pan base independent of the articulating movement of the seat pan. A legrest is mounted on the seat pan for articulating movement relative to and independent of the articulation of the seat pan and the seat back. The seat pan, seat back and legrest are each positioned and adapted for pivotal adjustment about the pivot within a predetermined range of motion to permit the seat pan, seat back and legrest to collectively move to a zero gravity recline position with the passenger's knees positioned above the passenger's hip region, providing resistance to forward movement of the passenger in the seat during TTOL.

In a further aspect, the passenger seat includes respective actuators mounted on the seat for translating the seat pan base relative to the seat carriage, articulating the seat pan relative to the seat pan base, articulating the seat back about the pivot and articulating the legrest relative to the seat pan and seat back.

In a further aspect, the passenger seat includes a rotary actuator having a rotary gear carried by the seat pan base and engaging a geared sector arm mounted stationary to the seat pan base for articulating the seat pan base about the pivot.

In a further aspect, the passenger seat has a range of motion between an upright position and a lie-flat position, and the TTOL position is at a position intermediate the upright position and the lie-flat position.

In a further aspect, the aircraft passenger seat includes an elongate, fore and aft-extending guideway in the carriage, first and second spaced-apart bearings carried by the seat base and positioned for rolling movement in the guideway and a translation actuator mounted on the seat base for translating the carriage fore and aft in relation to the seat base.

In a further aspect, the passenger seat includes an ottoman positioned on a stationary structure forward of the seat and spaced to align with the legrest to form a legrest extension when the seat is in a lie-flat position.

In a further aspect, an aircraft passenger seat is provided and adapted for maintaining a seated passenger in a recline position in the seat during taxi, take-off and landing ("TTOL") of a passenger aircraft. A seat carriage is mounted on a stationary seat base for fore and aft translating movement relative to a deck of the aircraft. A seat pan base is mounted on the seat carriage for translating movement with the seat carriage by a first actuator and articulating movement relative to the seat carriage by a second actuator. A seat pan is mounted for articulating movement relative to the seat pan base by the second actuator about a pivot positioned on the seat pan base. A seat back is mounted for articulating movement about the pivot positioned on the seat pan base by a third actuator independent of the articulating movement of the seat pan, and a legrest is mounted on the seat pan for articulating movement by a fourth actuator relative to and independent of the articulation of the seat pan and the seat back. The seat pan, seat back and legrest are each positioned and adapted for being infinitely adjustable within a predetermined range of motion to permit the seat pan, seat back and legrest to collectively move to a zero gravity recline position with the passenger's knees positioned above the passenger's hip region, providing resistance to forward movement of the passenger in the seat during TTOL.

In a further aspect, the second actuator is a rotary actuator having a rotary gear carried by the seat pan base and engaging a geared sector arm mounted stationary to the seat pan base for articulating the seat pan base about the pivot.

In a further aspect, the passenger seat includes an elongate, fore and aft-extending guideway in the carriage, first and second spaced-apart bearings carried by the seat base and positioned for rolling movement in the guideway, and a translation actuator mounted on the seat base for translating the carriage fore and aft in relation to the seat base.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description. The description makes reference to the included drawings. Like reference numerals in the drawings may represent and refer to the same or similar element, feature, or function. In the drawings.

DETAILED DESCRIPTION OF EXEMPLARY EMBODIMENTS

Figure 1:
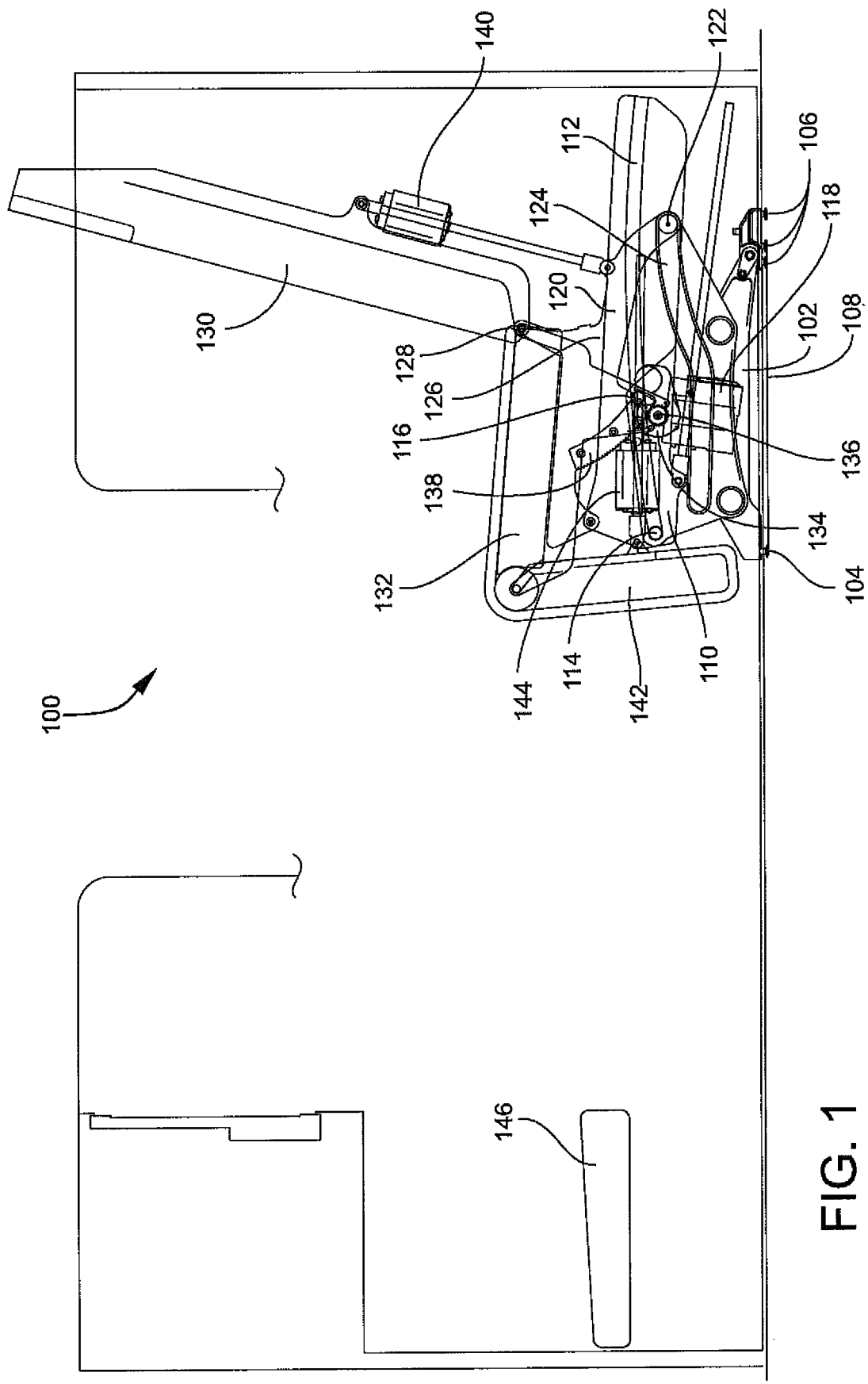
FIG. 1 is a side elevation of a seat passenger according to one exemplary embodiment, in an upright position.
Figure 2:
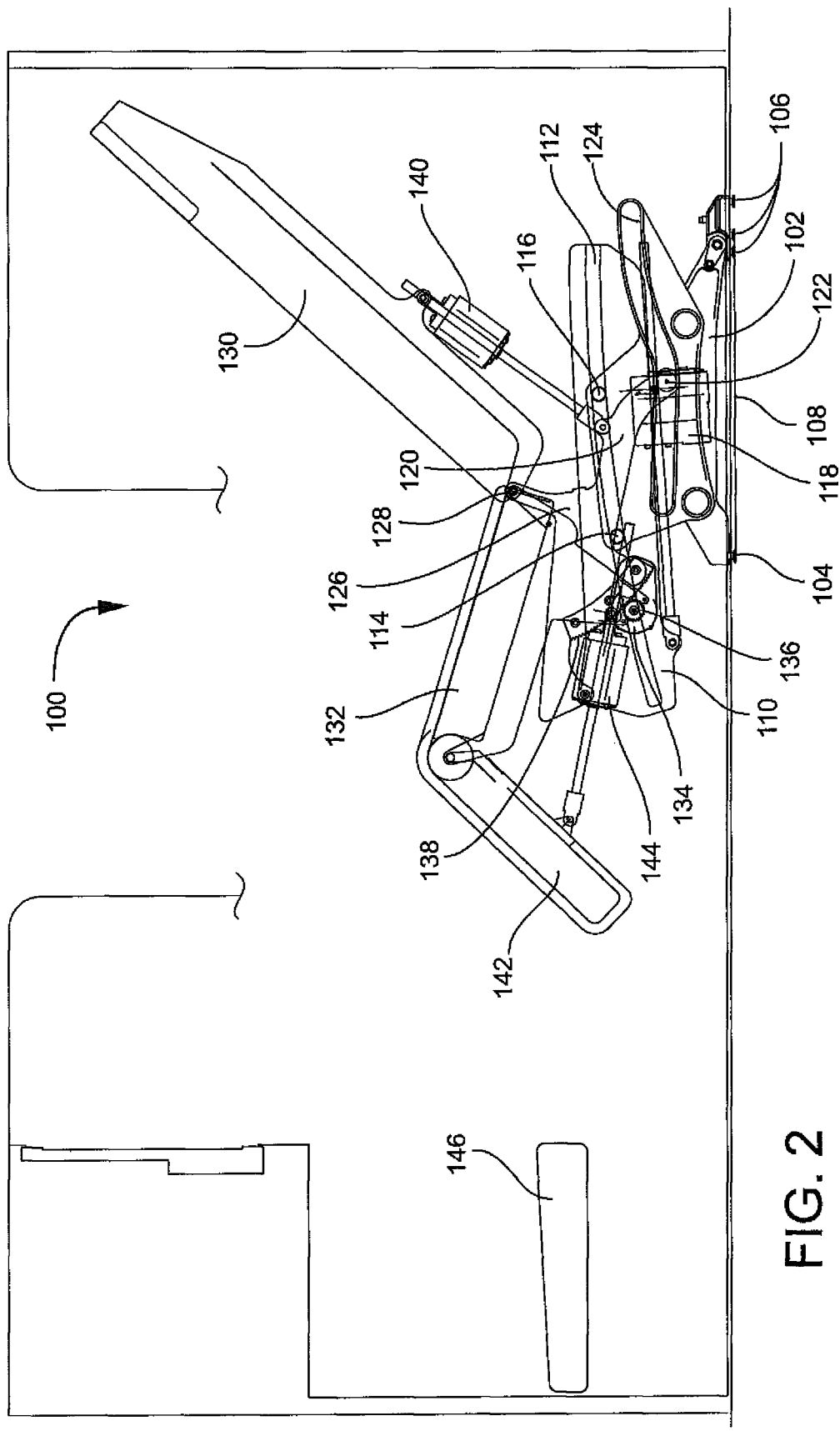
FIG. 2 is a side elevation of the seat of FIG. 1 in a lounge position.

The inventive concepts are described below with reference to the accompanying drawings in which exemplary embodiments are shown. However, the inventive concepts may be embodied in many different forms and should not be construed as limited to the representative embodiments set forth.

Referring now to FIGS. 1-6, a passenger seat according to an exemplary embodiment is shown generally at reference numeral 100. Seat 100 is mounted to an aircraft deck by a seat base 102 having fore and aft track fittings 104, 106 locked into tracks 108 in a known manner. A carriage 110 is mounted on the base 102 by means of an elongate, fore and aft-extending guideway 112 in the carriage 110 in which first and second spaced-apart bearings 114, 116 are carried by the seat base 102 and positioned for rolling movement in the guideway 112. A translation actuator 118 is mounted on the seat base 102 for translating the carriage 110 fore and aft in relation to the seat base 102.

A seat pan base 120 is mounted on the seat base 102 and pivots about a bushing 122 on the forward end of a pair of laterally spaced-part base side plates 124. The seat pan base 120 forms the principal structure by which the articulating and translating components are permitted to move in unison with infinite adjustability according to the engineering requirements of the seat 100. The seat 100 is provided with passenger and flight crew useable motion controls, not shown, for moving the seat 100 among desired positions illustrated in FIGS. 1-6. The seat pan base 120 includes an upwardly-extending mounting bracket 126, the upper end of which carries a pivot bushing 128. In a preferred embodiment, a seat back 130 and a seat pan 132 are mounted for pivoting movement on this single pivot bushing 128 and thus articulate about this single point defined by the pivot bushing 128. However, in other embodiments the seat back 130 and seat pan 132 may pivot about separate pivots that are proximate to rather than concentric with each other.

The seat pan base 120 is raised and lowered as it rotates about the bushing 122 by a rotary actuator 134 carried by the seat pan base 120 which has a rotary gear 136 engaging a geared sector arm 138 mounted stationary to the seat pan base 120. Clockwise rotation of the rotary actuator 134 raises the seat pan base 120, while counterclockwise rotation of the rotary actuator 134 lowers the seat pan base 120. These motions are transferred to the seat pan 132, causing the seat pan 132 to articulate about the pivot bushing 128.

The seat back 130 is articulated by an actuator 140 mounted between the seat pan base 120 and the seat back 130. A legrest 142 is mounted for pivoting movement on the forward end of the seat pan 132, and is articulated by an actuator 144 mounted between the seat pan base 120 and the legrest 142. In some embodiments, the legrest 142 may be positioned and spaced so that it aligns with an ottoman 146 in order to provide a longer bed when in the sleeping position of FIG. 3.

Figure 3:
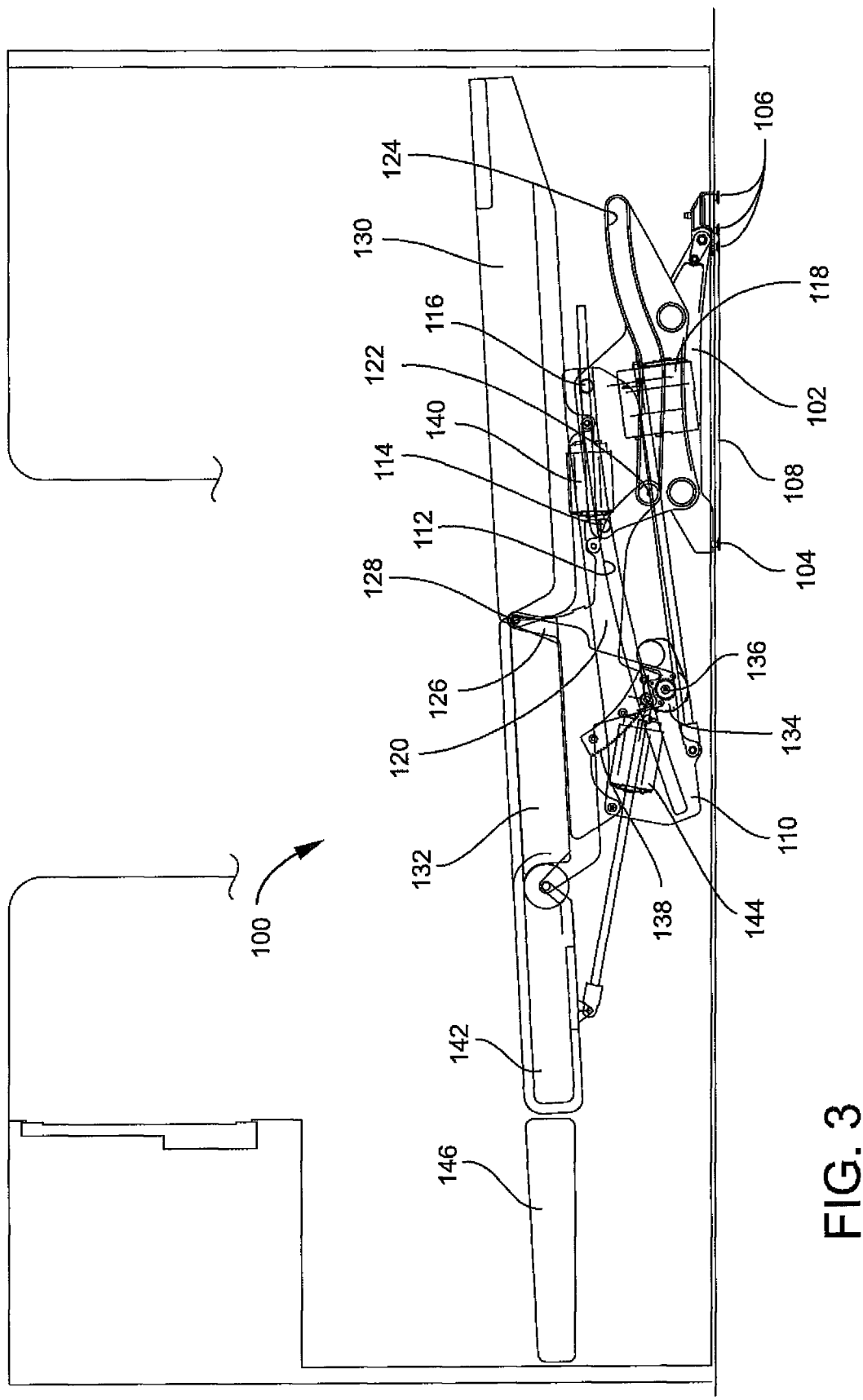
FIG. 3 is a side elevation of the seat of FIG. 1 in a lie-flat bed position.

As is apparent by the above description, the seat 100 is capable of infinite adjustment between the range of motion illustrated in FIGS. 1 and 3. Each of the actuators 118, 134, 140 and 144 are capable of independent motion. Thus, the seat back 130 and seat pan 132 move to alter the angle between them, while the seat pan base 120 alters the positions of the actuators 118, 134, 140 and 144 themselves. This compound simultaneous motion achieves a range of adjustment not found in earlier seat designs. Electronic controls, not shown, integrate and coordinate the movement of these components to achieve the desired seat position.

FIG. 1 illustrates a conventional TTOL position with the seat back 130 only slightly reclined, the seat pan 132 angled slightly upwardly in relation to the deck and the legrest 142 retracted under the seat pan 142 to permit the seat occupant's feet to rest on the deck. In this position the carriage 110 resides aft, over the seat base 102. In the lounge position shown in FIG. 2, the carriage 110 has translated partially forward, the seat back 120 has rotated rearward and the front of the seat pan 132 has been raised somewhat. In the lie-flat bed position of FIG. 3, the carriage 110 has moved fully forward, the seat back 130 has fully articulated downwardly while the seat pan 132 and legrest 142 have simultaneously moved into positions forming with the seat back 130 a lie-flat bed. Note the position of the ottoman 146 forming an extension of the bed.

Figure 4:
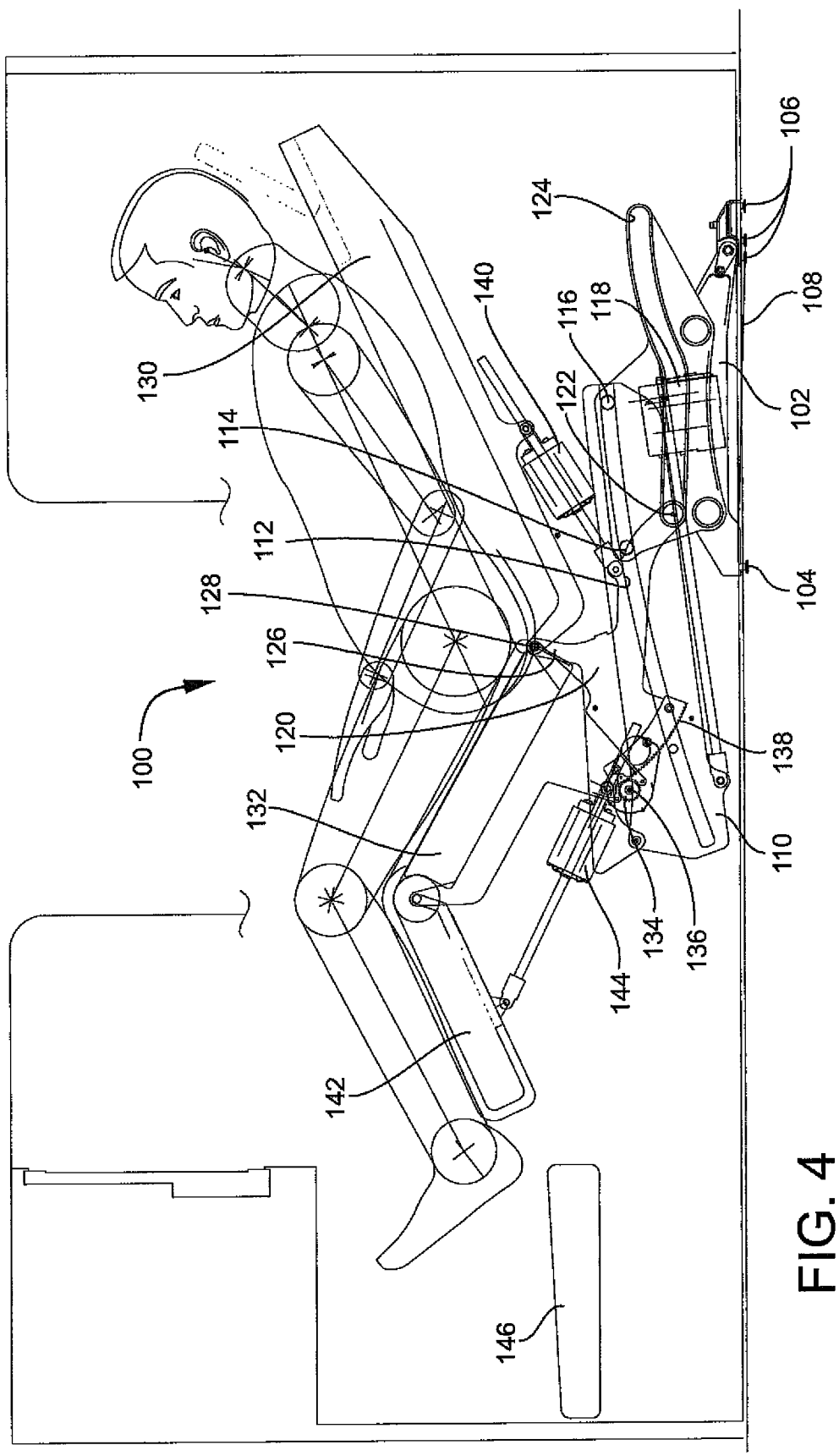
FIG. 4 is a side elevation of the seat of FIG. 1 in a "zero g" TTOL seating configuration.

The reclining zero-g position according to the invention is shown in FIG. 4, with a 50 percentile body shown resting on the seat 100. Note the relatively lower position of the seat back 130 and the raised forward end of the seat pan 132 where it joins the aft end of the legrest 142. This "hip low", "knee high" position provides a resistance to shear movement of the seat occupant during deceleration of the aircraft, as when landing. This position results in optimum body position with the body weight evenly distributed and promotes comfortable resting and sleep during long flights.

Figure 5:
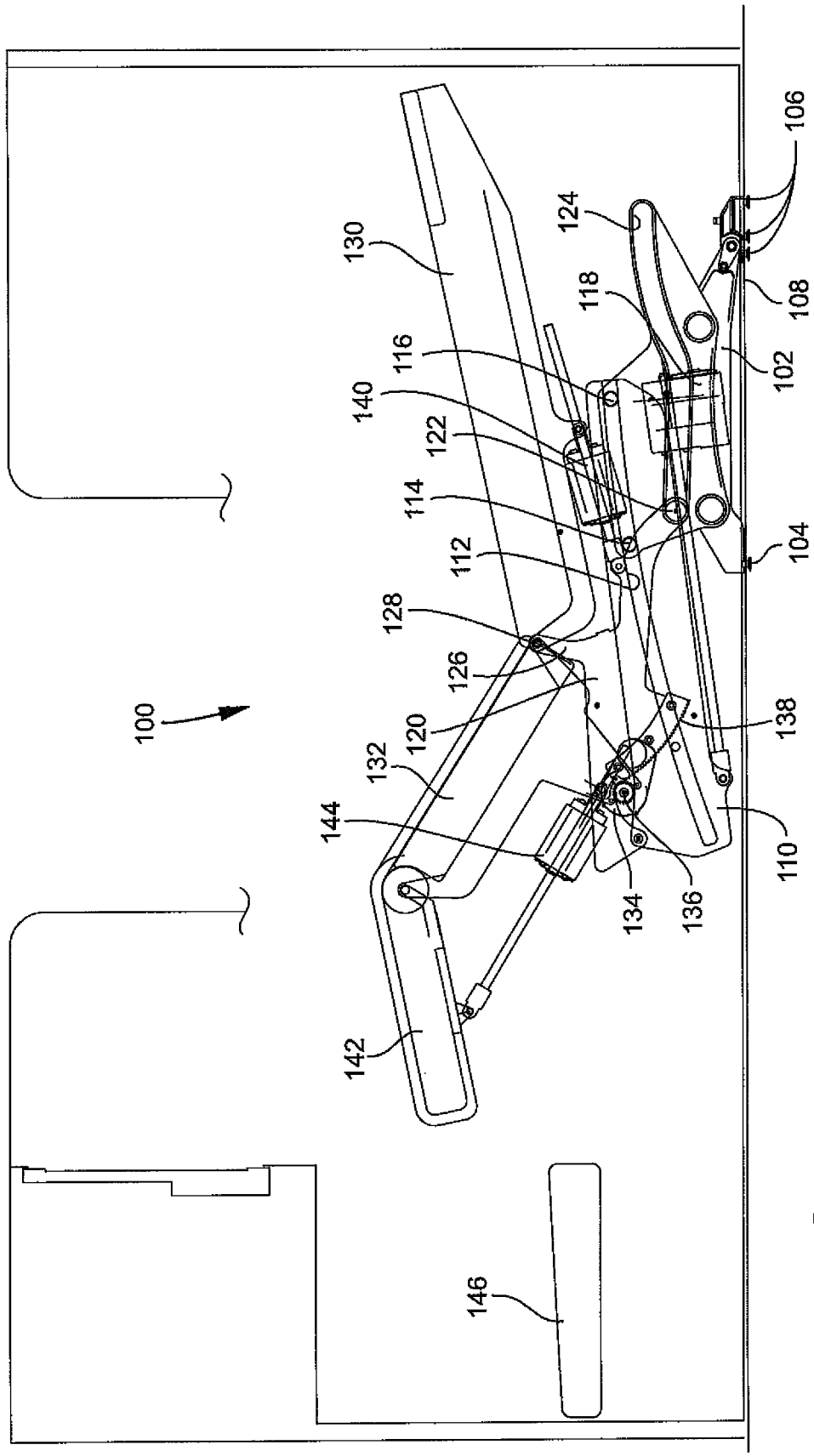
FIGS. 5 and 6 are side elevations of the seat of FIG. 4 in further reclined head down (FIG. 5) and head up (FIG. 6) positions achieved by articulating the seat pan and seat back about a fixed pivot.
Figure 6:
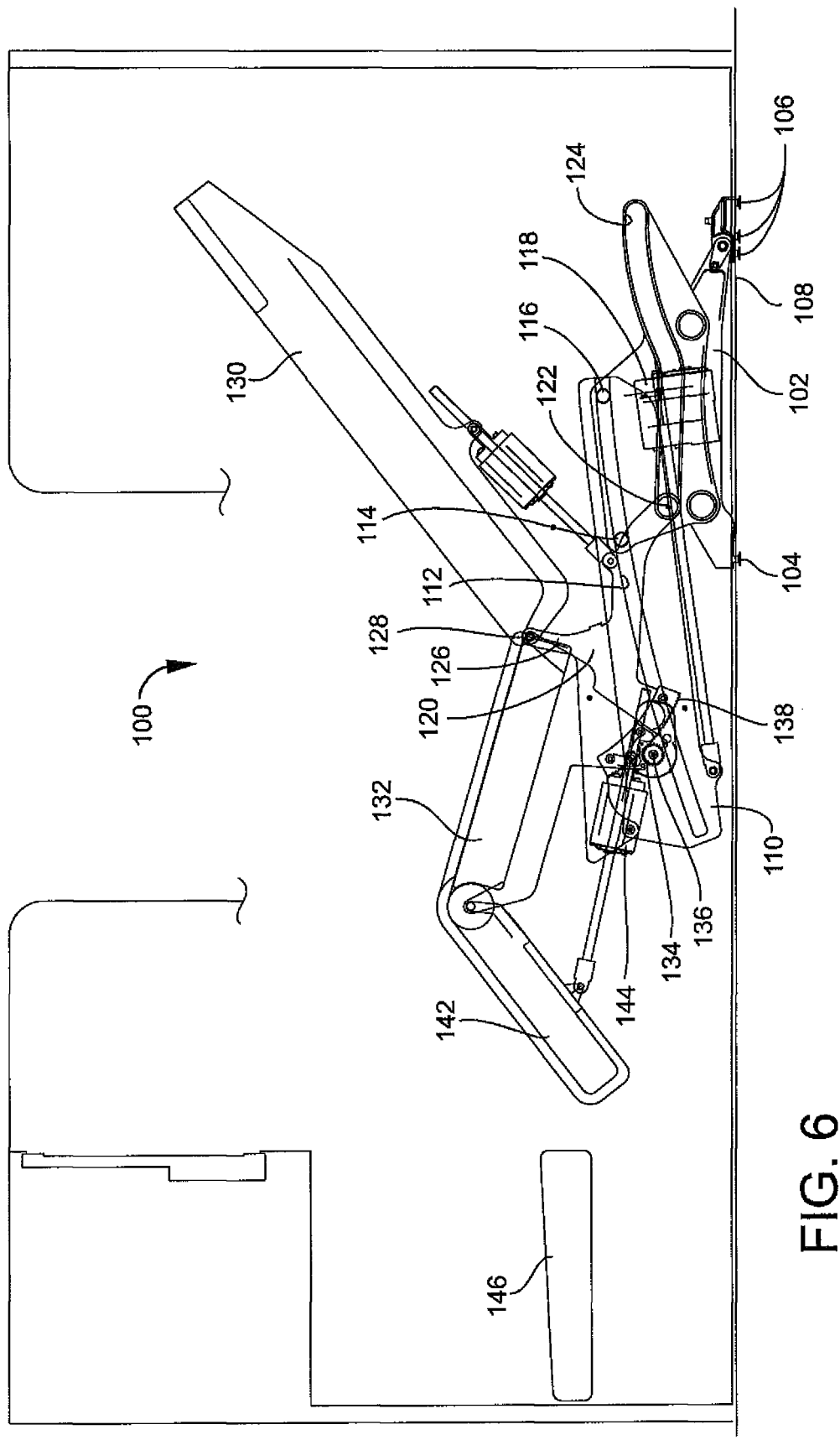

FIGS. 5 and 6 illustrate that adjustments can be made to the angle of the seat back 130 in relation to the seat pan 132 within the general range of the TTOL recline position.

Note that FIGS. 1-6 are scaled design drawings. Thus, relative angles and positions between, for example, the seat back 130 and the seat pan 132 and legrest 142 are accurate.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. An aircraft passenger seat assembly, comprising:
   a seat base mountable to an aircraft deck;
   a carriage movably mounted on the seat base by a guideway formed in the carriage in which first and second spaced bearings carried by the seat base travel within the guideway;
   a seat pan base pivotally coupled to the seat base by a moving pivot configured to travel along a guide formed in the seat base;
   a seat pan pivotally coupled to the seat pan base at a first rotational axis;
   a seat back pivotally coupled to the seat pan base at the first rotational axis;
   a rotary actuator carried by the seat pan and including a rotary gear engaging a geared sector arm affixed to the seat pan base such that movement of the carriage relative to the seat base rotates the rotary gear to change seat pan angle;
   a first actuator coupled to the seat base and the carriage for driving movement of the carriage relative to the seat base; and
   a second actuator coupled to the seat back and the seat pan base for articulating the seat back;
   wherein each of the first actuator, the second actuator, and the rotary actuator are independently adjustable, and wherein pivoting movement of the seat pan base relative to the seat base induces a position change in each of the first actuator, the second actuator and the rotary actuator.

2. The aircraft passenger seat assembly according to claim 1, further comprising a legrest coupled to the seat pan at a second rotational axis and a third actuator coupled to the legrest and the seat pan base for articulating the legrest, wherein pivoting movement of the seat pan base relative to the seat base induces a position change in the third actuator.

3. The aircraft passenger seat assembly according to claim 1, wherein the first actuator lengthens to drive the carriage forward relative to the seat base and the second actuator shortens to increase an angle between the seat back and the seat pan.

4. The aircraft passenger seat assembly according to claim 1, wherein the guideway is elongate and non-linear.

5. The aircraft passenger seat according to claim 1, wherein the seat pan and the seat back and configured for independent angular adjustment.

6. An aircraft passenger seat assembly including passenger support surfaces configured for positional adjustment to achieve an upright sitting position, a lie flat sleeping position, and an intermediate zero-G sitting position, the aircraft passenger seat assembly comprising:
   a seat base;
   a carriage movably coupled to the seat base by an elongate guideway formed in the carriage in which at least one guide carried by the seat base travels within the guideway;
   a seat pan base pivotally coupled to the seat base by a moving pivot configured to travel along a guide formed in the seat base;
   a seat pan pivotally coupled to the seat pan base at a first rotational axis;
   a seat back pivotally coupled to the seat pan base at the first rotational axis;
   a rotary actuator carried by the seat pan including a rotary gear engaging a geared sector arm affixed to the seat pan base such that movement of the carriage relative to the seat base rotates the rotary gear to change seat pan angle, wherein rotating the rotary gear in a first direction inclines the seat pan and rotating the rotary gear in a second direction opposite the first direction declines the seat pan;
   a legrest pivotally attached to the seat pan;
   a first actuator coupled to the seat base and the carriage for driving movement of the carriage relative to the seat base;
   a second actuator coupled to the seat back and the seat pan base for articulating the seat back; and
   a third actuator coupled to the legrest and the seat pan base for articulating the legrest;
   wherein each of the first actuator, the second actuator, the third actuator, and the rotary actuator are independently adjustable, and wherein pivoting movement of the seat pan base relative to the seat base induces a position change in each of the first actuator, the second actuator, the third actuator, and the rotary actuator.

7. The aircraft passenger seat assembly according to claim 6, wherein the first actuator lengthens to drive the seat carriage forward relative to the seat base and the second actuator shortens to increase an angle between the seat back and the seat pan.

8. The aircraft passenger seat assembly according to claim 6, wherein the guideway is elongate and non-linear.

9. The aircraft passenger seat according to claim 6, wherein the seat pan and the seat back and configured for independent angular adjustment.

* * * * *